A. P. FINN & F. L. DEAN.
GREASE CUP.
APPLICATION FILED SEPT. 28, 1914.
1,178,789.
Patented Apr. 11, 1916.
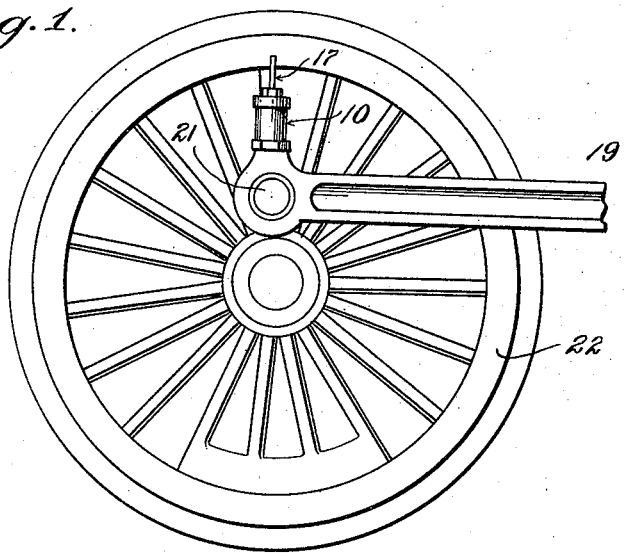
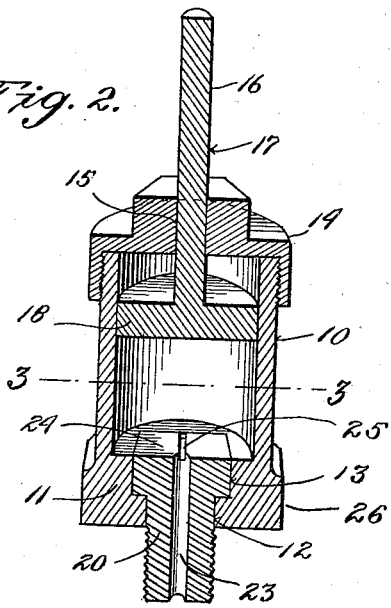
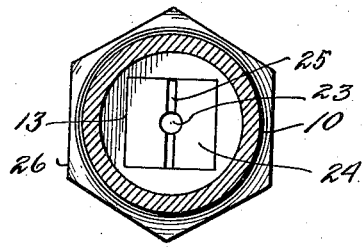
Witnesses
J. mac Carter
C. C. Chandlee.
Inventors
A. P. Finn
F. L. Dean
By Chandlee & Chandlee
Attorneys

UNITED STATES PATENT OFFICE.

AMBROSE P. FINN AND FRANK L. DEAN, OF CHICAGO, ILLINOIS.

GREASE-CUP.

1,178,789.

Specification of Letters Patent. Patented Apr. 11, 1916.

Application filed September 28, 1914. Serial No. 863,984.

*To all whom it may concern:*

Be it known that we, AMBROSE P. FINN and FRANK L. DEAN, citizens of the United States, residing at Chicago, in the county of Cook, State of Illinois, have invented certain new and useful Improvements in Grease-Cups; and I do hereby declare the following to be a full, clear, and exact description of the invention, such as will enable others skilled in the art to which it appertains to make and use the same.

This invention relates to lubricating devices and has particular reference to an improved form of grease cup designed for use in lubricating the crank pin and driving rod connection of locomotives or the like.

An object of the invention resides in the provision of a grease cup of the above character in which is embodied a novel form of gravity plunger, said plunger being actuated by motion of the drive wheel of the locomotive to force the grease to the parts to be lubricated, the speed with which said wheel revolves serving to automatically supply the proper amount of lubricant to the parts.

A further object of the invention resides in a novel form of connection whereby the cup may be quickly and easily engaged with or disengaged from the driving rod without the necessity of employing a special tool as is now the case.

With the above and other objects of similar nature in view, the invention consists in the construction, combination and arrangement of parts, set forth in and falling within the scope of the appended claim.

Figure 1 is a side elevation of the drive wheel and connecting rod of a locomotive with the invention applied thereto, Fig. 2 is a sectional perspective view of the oil cup, detached, and Fig. 3 is a transverse sectional view taken on the line 3—3 of Fig. 2.

Referring now more particularly to the drawing, the cup comprises a cylindrical container or reservoir 10, the lower end of which is provided with an inwardly directed flange 11, said flange resulting in a central opening 12 and being formed with a squared recess 13 communicating with said opening. Closing the other end of the reservoir 10 is a cap nut 14, in which is formed an opening 15 for slidably receiving the stem 16 of a gravity plunger 17, the head 18 of said plunger being loosely mounted in the reservoir 10 and adapted to reciprocate therein in the manner to be subsequently set forth.

For supporting the reservoir on the pitman 19, as shown in Fig. 1 of the drawing, there is provided a threaded bolt 20, this bolt being loosely inserted through the opening 12 in the reservoir base and engaged in a threaded opening formed in the pitman. To conduct the lubricant from the reservoir to the crank pin 21 which is carried by the driving wheel 22, there is formed longitudinally of the bolt 20, a passage 23, said bolt being further provided with a squared head 24 to seat within the recess 13 above referred to.

To facilitate application of the bolt 20 to the pitman, the head 24 is provided with a transverse groove 25, for the reception of a screw driver or other suitable tool, whereby the initial threading of said bolt on the pitman may be readily accomplished. It will be noted that when the cup is in applied position the upper face of the bolt head lies flush with the base of the reservoir 10, thereby obviating the waste grease collecting space usually found in devices of this nature.

In applying the cup, the bolt 20 is started into the pitman opening in the manner above-described, and the reservoir 10 then raised to bring the bolt head 24 into the squared recess 13. An ordinary wrench may then be applied to the flange 26 of the reservoir and the bolt thus readily tightened. It is therefore apparent by this construction, that the necessity for employment of special tools in applying or removing the cup from the pitman will be entirely obviated. It will also be readily observed that when the wheel revolves, the eccentric action of the pitman will cause the plunger to be reciprocated in the reservoir, and the lubricant therein thereby forced through the passage in the bolt to the crank pin, the speed with which said wheel revolves serving to automatically supply the proper amount of lubricant to the parts.

What is claimed is:

A grease cup comprising a reservoir having an opening in the base thereof and a squared recess communicating therewith, a wrench receiving flange formed on the reservoir, a threaded bolt loosely engaged through said opening and having an oil passage therethrough communicating with the reservoir, and a squared head on said bolt normally seated within said recess to lie flush with the bottom of the reservoir, said head being provided on its upper face with a transverse groove.

In testimony whereof, we affix our signatures, in the presence of two witnesses.

AMBROSE P. FINN.
FRANK L. DEAN.

Witnesses:
GOTTFRIED W. STUTE,
VIOLA A. STUTE.

Copies of this patent may be obtained for five cents each, by addressing the "Commissioner of Patents, Washington, D. C."